United States Patent [19]

Kratzer et al.

[11] 3,896,159

[45] July 22, 1975

[54] PRODUCTION OF DICARBOXYLIC ACID DIESTERS

[75] Inventors: Otto Kratzer, Bobenheim-Roxheim; Hansjoerg Bipp, Limburgerhof, both of Germany

[73] Assignee: BASF Aktiengesellschaft, Ludwigshaften (Rhine), Germany

[22] Filed: May 10, 1974

[21] Appl. No.: 468,743

[30] Foreign Application Priority Data

May 12, 1973 Germany............................ 2324165

[52] U.S. Cl. ...... 260/475 B; 260/475 R; 260/485 R; 260/485 S
[51] Int. Cl....................... C07c 67/06; C07c 69/80
[58] Field of Search..................... 260/475 B, 485 S

[56] References Cited
UNITED STATES PATENTS
3,843,697  10/1974  Khaidukov et al.............. 260/475 B Primary Examiner—Lorraine A. Weinberger
Assistant Examiner—E. Jane Skelly
Attorney, Agent, or Firm—Johnston, Keil, Thompson & Shurtleff

[57] ABSTRACT

A process for the production of diesters of aliphatic and aromatic dicarboxylic acids or their anhydrides and alcohols of three to fifteen carbon atoms while recycling the alcohol used in excess and in the absence of an esterification catalyst at a temperature of from 150° to 250°C in which the reaction mixture, after water of esterification has been removed, has aqueous alkali added to the point of neutralization to separate the monoester from the diester, the aqueous solution of the monoester salt thus separated is acidified with sulfuric acid to recover the monoester, the diester is washed with water to remove residues of alkali and the diester which has been washed until neutral is treated with steam, wherein there is added to the aqueous solution of the monoester salt prior to, during or after acidification a weight of the alcohol serving for the production of the ester which is from one-half to once the weight of the monoester salt, washing of the diester is carried out in two stages, the water of esterification and the aqueous condensate obtained in the final steam treatment are used together or separately for washing the diester and the waste water obtained in the diester washing is used completely for the production of the aqueous alkali.

3 Claims, 1 Drawing Figure

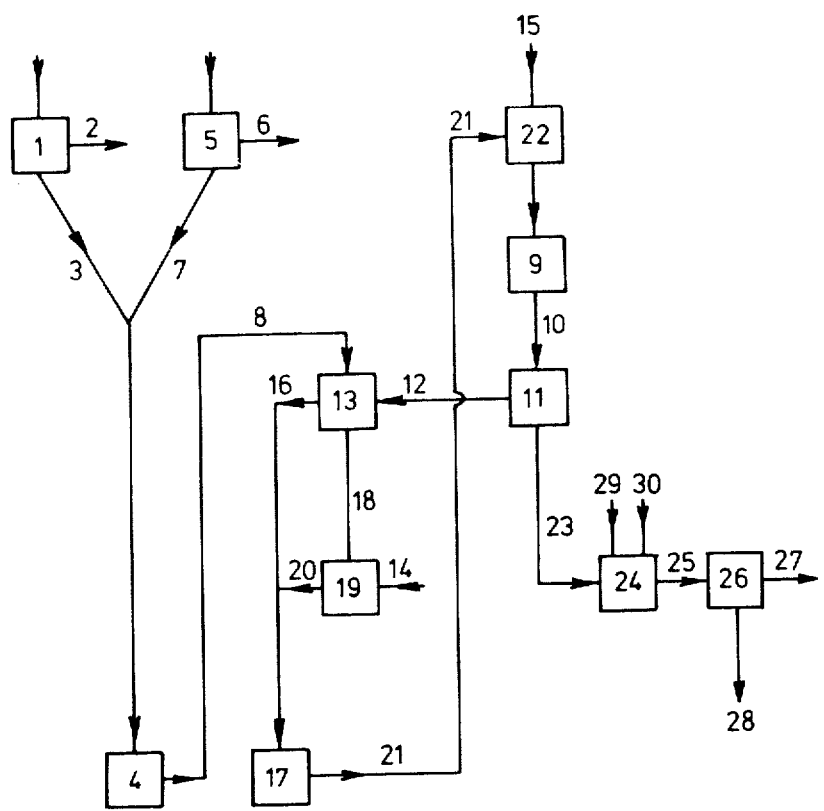

PRODUCTION OF DICARBOXYLIC ACID DIESTERS

This invention relates to a new process for the production of dicarboxylic acid esters.

Diesters of aliphatic or aromatic dicarboxylic acids and higher aliphatic alcohols are used extensively in the plastics industry as PVC plasticizers and are manufactured in large amounts.

It is known that diesters of aliphatic or aromatic dicarboxylic acids and higher alcohols can be prepared by reaction of the dicarboxylic acid or its anhydride with the alcohol at elevated temperature in the presence or absence of an esterification catalyst and/or azeotropic entrainer.

According to a particularly advantageous industrial scale method the diesters of phthalic acid required to a great extent as plasticizers are prepared from phthalic anhydride and the alcohols while returning the alcohol (used in excess) and in the absence of esterification catalysts and entrainers at a temperature of from 180° to 250°C. In this continuous method which is described in Chemie-Ing. Technik 41 (1969), page 971, and also in other methods there is obtained waste water which because of its quantity and its content of organic and inorganic contaminants constitutes a serious environmental problem.

Thus for example in the production of 100 kg of di-2-ethylhexyl phthalate according to the abovementioned method in the sequence stated there are discharges of soiled waste water at five different places in the following amounts:

a. in the esterification which proceeds with the separation of water of esterification, the water of reaction being removed with excess alcohol by distillation and the alcohol recycled: 4.6 liters of water of esterification;

b. in the acidification of the aqueous solution of monoester salt (obtained in the neutralization of the crude ester for the recovery of the monester: 35 liters of acid waste water;

c. in the washing of the monoester obtained according to (b) for the complete removal of sulfuric acid: 10 liters of wash water;

d. in the washing of the diester after neutralization for the complete removal of caustic soda solution: 80 liters of wash water;

e. in the steam treatment of the diester (washed until neutral) for the removal of residues of water and alcohol: 14 liters of waste water (stripping condensate).

There is thus obtained a total of waste water of about 140 liters in the production of 100 kg of di-2-ethylhexyl phthalate.

The waste waters from steps (a) and (e) are saturated with alcohol, while the waste waters from the other three steps of the process contain not only alcohol but also among others residues of dicarboxylic acid, monoester and diester. The average BOD (biochemical oxygen demand (5-day period of incubation) according to "Deutsche Einheitswerte zur Wasser-Abwasser-Schaumaufbereitung," 3rd edition) of this combined soiled waste water is about 20,000 mg/liter. The waste waters described under (b), (c) and (d) bear the highest concentration of organic substances. Since these waste waters are either discharged untreated or have to be processed by biological treatment or some other method, a continuous process which will permit the advantageous manufacture of these important dicarboxylic acid esters on an industrial scale with a substantial reduction in the amount of waste water is to be sought after in order that the environment may be protected.

We have now found that in the continuous production of diesters from aliphatic and aromatic dicarboxylic acids or their anhydrides and alcohols of three to fifteen carbon atoms in which the esterification is carried out with the recycling of the alcohol used in excess and in the absence of an esterification catalyst at a temperature of from 150° to 250°C in which the reaction mixture, after water of esterification has been removed, has aqueous alkali added to the point of neutralization to separate the monoester from the diester, the aqueous solution of the monoester salt thus separated is acidified with sulfuric acid to recover the monoester, the diester is washed with water to remove residues of alkali and the diester which has been washed until it is neutral is treated with steam, the said waste water difficulties are substantially avoided when there is added to the aqueous solution of the monoester salt prior to, during or after acidification a weight of the alcohol serving for the production of the ester which is from half to once the weight of the aqueous solution of the monoester salt, washing of the diester is carried out in two stages, the water of esterification and the aqueous condensate obtained in the final steam treatment are used together or separately for washing the diester and the waste water obtained in the diester washing is used completely for the production of the aqueous alkali.

The incidence of waste water may be decreased by about 75% of the original amount according to the new process as compared with the conventional methods. Moreover the incidence of waste water described under (c) is avoided by dispensing with after-washing of the monoester. This advantageous result is surprising because thorough performance of the two washing stages described under (c) and (d) is of decisive importance in the prior art methods for the production of high-grade plasticizer esters. Afterwashing of the monoester for complete removal of the acid residues was held to be an important feature for avoiding impairment of the quality of the plasticizer esters such as discoloration. Only the stream of waste water specified under (b) remains as waste water in the process according to the invention. For 100 kg of diester it amounts to 35 liters and shows a BOD of about 28,000 mg/liter.

Examples of aliphatic and aromatic dicarboxylic acids or their anhydrides are adipic acid, phthalic anhydride, maleic anhydride fumaric acid, malonic acid, succinic acid, glutaric acid, suberic acid, azelaic acid, sebacic acid and particularly phthalic anhydride and adipic acid. Examples of alcohols of three to 15 carbon atoms are butanol, n-octanol-(1), n-octanol-(2), 2-ethylhexanol-(1), n-nonyl alcohol, isononyl alcohol, decanol and isodecanol.

Esterification of the starting material is carried out in the conventional manner in the absence of esterification catalysts and preferably in the absence of entrainers while returning the excess of alcohol used, the excess being about up to 2 moles and preferably up to 1 mole of alcohol per mole of dicarboxylic acid or anhydride.

A suitable embodiment of the process of the invention will now be described with reference to the drawing:

In this example di-2-ethylhexyl phthalate is prepared in an esterification apparatus by the method described in German Printed Application (DAS) No. 1,225,164. Consequently the alcohol is 2-ethylhexanol, the monoester is the 2-ethylhexyl monoester of phthalic acid and the diester is the 2-ethylhexyl diester of phthalic acid.

The mixture of water of reaction and alcohol distilled off from the esterification apparatus is collected in a separator 1. The alcohol is returned through line 2 to the esterification apparatus and the water of reaction passes through line 3 into a collecting vessel 4. The neutralized washed diester is freed from excess alcohol and water by vaporization at subatmospheric pressure of for example from 10 to 100 mm and at a temperature for example of from 100° to 150°C. After the expelled mixture of alcohol and water has been condensed it is collected in a separator 5 and the phases are separated. The alcoholic phase passes through line 6 back into the esterification apparatus while the waste water is discharged through line 7 also into the collecting vessel 4.

The crude ester is neutralized with aqueous caustic alkali solution, conveniently with dilute (preferably from 2 to 7%) caustic soda solution at a temperature of from 50° to 95°C, for example in a stirred vessel 9. The mixture is then passed through line 10 into a separator 11 for phase separation. The diester phase is passed through line 12 into the first washing stage 13. The collected waste water from the esterification and vaporization stages is used as wash water; it passes from the collecting vessel 4 through line 8 into the first washing stage 13. Washing takes place at from 60° to 100°C. The waste water phase from this washing stage is discharged through line 16 into collecting vessel 17. The ester phase is supplied through line 18 to the second washing stage 19 and washed for example with condensate or fully demineralized water through line 14 at from 60° to 100°C in the ratio of ester to water of about 10:1. The waste water from the second washing stage passes through line 20 and is also collected in the collecting vessel 17 and is fed together with the wash water from the first washing stage through line 21 into a mixing apparatus 22 for dilution of for example caustic soda solution of 25% strength to the desired degree of dilution of for example from 2 to 17%. Caustic soda solution is supplied through line 15.

The aqueous alkaline phase from separator 11, which contains the monoester in the form of its sodium salt in solution, is passed through line 23 for monoester processing at 24 and is acidified with sulfuric acid for example of from 50 to 98% by weight strength. Prior to, during or after the acidification there is added at a temperature of up to 100°C and advantageously from 70° to 95°C an amount of the alcohol which has also served for production of the ester which is from half the weight to equal to the weight of the aqueous monoester salt solution. The sulfuric acid is supplied through line 29 and the alcohol through line 30. The mixture obtained passes through line 25 to separator 26 where it is separated into an aqueous phase and an alcoholic phase. The alcoholic phase which contains the monoester in solution is returned through line 27 to the esterification section. The aqueous phase finally leaves the process through line 28 as the sole remaining stream of waste water.

If necessary the amount of diluent water can be adapted to fluctuations in the requirement of caustic soda solution caused by variations in the acid number of the crude ester by way of the feed of fully demineralized water at 13.

The remaining stream of water water waste only about one quarter of the waste water conventionally obtained.

As the above example demonstrates the pollution of the environment and the waste water processing plant by organic contaminants is decreased in the process of the invention. Moreover the amount of wash water required is much less than in the conventional methods of manufacture of these plasticizer esters.

We claim:

1. A process for the continuous production of diesters of aliphatic and aromatic dicarboxylic acids or their anhydrides and alcohols of three to fifteen carbon atoms while recycling the alcohol used in excess and in the absence of an esterification catalyst at a temperature of from 150° to 250°C in which the reaction mixture, after water of esterification has been removed, has aqueous alkali added to the point of neutralization to separate the monoester from the diester, the aqueous solution of the monoester salt thus separated is acidified with sulfuric acid to recover the monoester, the diester is washed with water to remove residue of alkali and the diester which has been washed until neutral is treated with steam, wherein there is added to the aqueous solution of the monoester salt prior to, during or after acidification a weight of the alcohol serving for the production of the ester which is from one-half to once the weight of the aqueous solution of the monoester salt, washing of the diester is carried out in two stages, the water of esterification and the aqueous condensate obtained in the final steam treatment are used together or separately for washing the diester and the waste water obtained in the diester washing is used completely for the production of the aqueous alkali.

2. A process as claimed in claim 1 wherein phthalic anhydride or adipic acid is used as the dicarboxylic acid or anhydride.

3. A process as claimed in claim 1 wherein the alcohol used is butanol, n-octanol-(1), n-octanol-(2), 2-ethylhexanol-(1), n-nonyl alcohol, isononyl alcohol, decanol or isodecanol.

* * * * *